United States Patent [19]

Provost

[11] Patent Number: 5,192,721
[45] Date of Patent: Mar. 9, 1993

[54] PROCESS FOR LINING A DISTRIBUTOR FOR CONTINUOUS CASTING OF METALS WITH A REFRACTORY MATERIAL CORRESPONDING DISTRIBUTOR AND REFRACTORY LINING

[75] Inventor: Joseph G. Provost, Bergues, France

[73] Assignee: Sollac, Puteaux, France

[21] Appl. No.: 752,667

[22] PCT Filed: Feb. 26, 1990

[86] PCT No.: PCT/FR90/00130
§ 371 Date: Aug. 23, 1991
§ 102(e) Date: Aug. 23, 1991

[87] PCT Pub. No.: WO90/09970
PCT Pub. Date: Sep. 7, 1990

[30] Foreign Application Priority Data

Feb. 27, 1991 [FR] France ................... 8902926

[51] Int. Cl.$^5$ .................. C04B 35/06; C04B 35/22
[52] U.S. Cl. ................... 501/113; 501/123; 501/108
[58] Field of Search ............... 501/108, 109, 113, 123

[56] References Cited

U.S. PATENT DOCUMENTS 4,789,652  12/1988  Ichikawa et al. .............. 501/127

FOREIGN PATENT DOCUMENTS 260322   3/1988   European Pat. Off. .
1218923  6/1966   Fed. Rep. of Germany .
1239226  4/1967   Fed. Rep. of Germany .
527024   10/1940  United Kingdom .

Primary Examiner—Karl Group
Assistant Examiner—Chris Gallo
Attorney, Agent, or Firm—Cushman, Darby & Cushman

[57] ABSTRACT

The invention relates to a process for lining a distributor for continuous casting of metals, in particular steel, according to which the layer of refractory wear lining is placed in position in aqueous form, characterized in that the said refractory wear lining is composed of raw natural dolomite or raw natural calcite or of a mixture of these two materials, in that its particle size is between 0 and 5 mm, in that a binder, in proportions of 0.5 to 5% by weight, and an inorganic or organic plasticiser, in proportions of 0.2 to 3% by weight, are incorporated in this lining and in that the decarbonization of this lining is carried out after it has been placed in position, during the drying and the calcining thereof.

The invention also relates to a distributor lined in this way and to the refractory lining itself.

12 Claims, No Drawings

PROCESS FOR LINING A DISTRIBUTOR FOR CONTINUOUS CASTING OF METALS WITH A REFRACTORY MATERIAL CORRESPONDING DISTRIBUTOR AND REFRACTORY LINING

The present invention relates to the field of continuous casting of metals, in particular steel. It relates more particularly to the distributors, or tundishes, and even more particularly to their inner refractory lining.

The refractory lining of a distributor for continuous casting of steel is nowadays frequently applied on a permanent sub-layer, most generally of dense refractory concrete, in aqueous form by means of various techniques such as sputtering, trowelling, casting, vibratory casting or tamping. This lining is then dried before the distributor is used.

Magnesia is the material most commonly used for this application, because, in particular, of its low reactivity towards strong deoxidising elements, such as aluminium or calcium, contained in the liquid steel. However, the magnesia linings which are customarily used still have a silica content which is not negligible (from 5 to 15%). Now, the reduction of silica by strong deoxidising agents leads to the formation of non-metallic inclusions, which pollute the metal. It is therefore necessary that the part of the lining which is in contact with the liquid metal has as low as possible a silica content if a high inclusionary cleanliness is desired for the cast product. The use of magnesia of a higher purity is possible, but substantially increases the cost of the lining.

Another drawback of magnesia is its high apparent mass per unit volume, which has an adverse effect on the thermal insulation properties of the lining. Even in the case where the weight of the lining is reduced by the incorporation of diverse fibres, its mass per unit volume remains of the order of 1600 to 1800 kg/m$^3$.

In order to lower the content of reducible compounds in the lining, it is known, for example in the European Patent Application 260322, to incorporate in said lining a more or less significant proportion of calcined dolomite. However, this latter material has a high apparent mass per unit volume (more than 3200 kg/m$^3$). This high density has advantages for the lining of furnaces and casting ladles because it confers on the calcined dolomite a high resistance to wear and to corrosion by the slags. However, these properties are of little importance in the distributors, where the temperature of the liquid metal does not exceed 1600° C., where the time for which the lining is used does not exceed 10 to 20 hours and where only minor quantities of aggressive slags penetrate. On the other hand, the lack of insulating power on the part of the calcined dolomite would be very troublesome with regard to good preservation of the temperature of the metal, which is of prime importance at this stage of casting. For all of these reasons, calcined dolomite is never used on its own to line the distributors for continuous casting.

The aim of the invention is to take advantage of the high chemical inertia of dolomite, and of the carbonates of alkaline earth elements in general, towards strong deoxidising agents in liquid steel while obtaining insulating properties for the distributor lining which are superior to those of magnesia.

To this end, the subject of the invention is a process for lining a distributor for continuous casting of metals, in particular steel, according to which the layer of refractory wear lining is placed in position in aqueous form, characterised in that the said refractory wear lining is composed of raw natural dolomite or of raw natural calcite or of a mixture of these two materials, in that its particle size is between 0 and 5 mm, in that a binder, in proportions of 0.5 to 5% by weight, and an inorganic or organic plasticiser, in proportions of 0.2 to 3% by weight, are incorporated in this lining and in that the decarbonisation of this lining is carried out after it has been placed in position, during the drying and the calcining thereof.

Preferably, the particle size of the raw dolomite and of the raw calcite is between 0 and 1 mm. The density of the lining after drying is less than 1500 kg/m$^3$ and preferably between 1100 and 1400 kg/m$^3$.

Further subjects of the invention are a distributor lined in this way, and the refractory lining itself, as defined in the appended claims.

As will be understood, one of the essential characteristics of the invention consists in using dolomite in its natural form and no longer in precalcined form. Under these conditions, the dolomite lining has not only chemical but also physical properties very suitable for its use. It is also possible to use natural calcite, on its own or as a mixture with natural dolomite.

Usually, dolomite $CaCO_3\text{-}MgCO_3$ is used as lining for metallurgical vessels in its calcined form, consequently having undergone a prior decarbonisation. This decarbonisation gives rise to a loss on ignition of 44 to 48% depending on the purity of the dolomite and creates a porosity in the material, which calcining at high temperature tends to counteract. The temperature at which the dolomite starts to densify as a result of sintering depends on its purity. Thus, for a level of impurities of less than 3%, this densification starts at about 1550° C. At 1900° C. the densification allows a material having an apparent density of more than 3200 kg/m$^3$ to be obtained, as indicated above. Now, it has been seen that such a densification was not desirable for a distributor lining because it diminishes its insulating power and increases its calorific capacity.

The value of the use of natural raw dolomite as distributor lining is that the decarbonisation takes place only after the lining has been placed in position. It is effected by heating at between 800° and 950° C., this latter temperature being the minimum temperature of the coldest point to be reached for a total decarbonisation. This heating also makes it possible to dry the refractory and, if the distributor is used immediately after calcining, to limit the heat losses of the liquid metal and the thermal shock to which the lining is subjected during filling of the distributor. This decarbonisation permits "in situ" lowering of the apparent density of the lining from 2700–2850 kg/m$^3$ down to less than 1500 kg/m$^3$, and preferably in the region 1100–1400 kg/m$^3$ when it is taken into service. This final density is therefore substantially less than that of the magnesia-based linings. Moreover, it does not increase too perceptibly during use of the lining because the duration of this use is relatively brief and the temperatures reached by the liquid metal in the distributor are scarcely sufficient to initiate densification of the dolomite.

This low mass per unit volume in service guarantees a good thermal insulation and a low calorific capacity for the distributor lining. This gives the user better control over heat phenomena occurring inside the distributor during casting, compared with the magnesia-based linings. Compared with these same linings, the inclusionary cleanliness of the liquid metal is also improved because of the reduction in the contents of reducible oxides such as silica, alumina and iron oxides. In addition to the gains in cleanliness of the final product, this gives rise to a reduction in the tendency of the casting nozzles to block. It is thus possible to increase the amount of metal cast in the distributor with the same lining. Finally, the inclusions of alumina contained in the liquid metal are able to be trapped by the dolomite.

In order to form this lining, in accordance with other essential characteristics of the invention, the raw dolomite is mixed with a binder of the same type as those conventionally used for this application, such as sodium silicate, in proportions which must be between 0.5 and 5% by weight in order to ensure a sufficient resistance of the material to abrasion. An inorganic plasticiser, such as clay or an organic plasticiser, is incorporated in the mixture in an amount of 0.2 to 3% by weight, with the aim of preventing the migration of the binder during drying. Water is then added and the lining is placed in position in the distributor using one of the customary techniques mentioned above.

The particle size of the raw dolomite particles and/or raw calcite particles used to form the lining is less than 5 mm and preferentially less than 1 mm. In this latter case, it is further recommended that 15 to 40% of the particles have a particle size of less than 0.1 mm.

Another advantage of this type of coating is its low cost, as it is produced from abundant natural starting materials.

A conventional magnesia lining has a composition of the following type after calcining at 1500° C., expressed in % by weight:

| MgO | CaO | $Al_2O_3$ | $Fe_2O_3$ | $SiO_2$ |
|---|---|---|---|---|
| 78/85 | 1/2 | 1.5/2.5 | 2/3 | 15/5 | and its apparent mass per unit volume is 1600 to 1800 $kg/m^3$.

An example of a lining according to the invention, produced from natural raw dolomite, has the following composition, expressed in % by weight, after calcining at 1500° C.:

| MgO | CaO | $Al_2O_3$ | $Fe_2O_3$ | $SiO_2$ |
|---|---|---|---|---|
| 56/58 | 36/38 | 0.2/0.5 | 0.2/0.5 | 0.5/1.5 | and an apparent mass per unit volume of 1210 $kg/m^3$.

In place of natural raw dolomite it is possible to use natural raw calcite $CaCO_3$, the physical and chemical properties of which are similar to those of raw dolomite. The densification of calcite even starts at a temperature which is slightly higher compared with that for dolomite. Calcite and dolomite may, moreover, be mixed in any proportions to make up the coating.

Similarly, the invention, although specific for distributors for continuous casting, may be implemented using binders and/or plasticisers other than those given as examples here, insofar as the agent used as binder has the effect of improving the abrasion resistance of the lining and insofar as the agent used as plasticiser has the effect of preventing the binder from migrating into the interior of the lining during drying.

I claim:

1. A process for lining a distributor for continuous casting of metals, according to which a layer of refractory wear lining is placed in position in aqueous form, characterized in that said refractory wear lining is prepared from a material consisting essentially of raw natural dolomite or raw natural calcite, or of a mixture thereof, which is chosen with a particle size of between 0 and 5 mm, and a binder, in proportions of 0.5 to 5% by weight, and an inorganic or organic plasticizer, in proportions of 0.2 to 3% by weight, are incorporated in this material and in that after it has been placed in position on the distributor, the decarbonization of this lining is carried out during the drying and calcining thereof.

2. Process according to claim 1, wherein a particle size of the raw dolomite and of the raw calcite of between 0 and 1 mm is chosen.

3. Process according to claim 1 or 2, wherein the binder chosen is sodium silicate.

4. Process according to claim 1 or 2, wherein the plasticizer chosen is clay.

5. A distributor for continuous casting of metals, provided with a refractory wear lining, wherein said lining consists essentially of decarbonized raw natural dolomite or decarbonized raw natural calcite, or a mixture thereof, the particle size of which is between 0 and 5 mm, a binder, present in a proportion of 0.5 to 5% by weight, and a plasticizer, in a proportion of 0.2 to 3% by weight wherein the decarbonization takes place in situ.

6. Refractory wear lining for a distributor for continuous casting of metals, consisting essentially of:
   at least one of raw natural dolomite decarbonized in situ and raw natural calcite decarbonized in situ, with a particle size of between 0 and 5 mm,
   a binder in proportions of 0.5 to 5% by weight, and
   an inorganic or organic plasticizer in proportions of 0.2 to 3% by weight.

7. Refractory lining according to claim 6, wherein the particle size of the raw natural dolomite and of the raw natural calcite is between 0 and 1 mm.

8. Refractory lining according to claim 7, wherein between 15 and 40% of particles have a said particle size of less than 0.1 mm.

9. Refractory lining according to any one of claims 6 to 8, wherein a density after drying and calcining is less than 1500 $kg/m^3$.

10. Refractory lining according to claim 9, wherein said density after drying and calcining is between 1100 and 1400 $kg/m^3$.

11. Refractory lining according to any one of claims 6 to 8, wherein the binder is sodium silicate.

12. Refractory lining according to any one of claims 6 to 8, wherein the plasticizer is clay.

* * * * *